United States Patent [19]

Juday

[11] Patent Number: 5,768,242

[45] Date of Patent: Jun. 16, 1998

[54] APPARATUS AND METHOD FOR FOCUSING A LIGHT BEAM IN A THREE-DIMENSIONAL RECORDING MEDIUM BY A DYNAMIC HOLOGRAPHIC DEVICE

[75] Inventor: Richard D. Juday, Houston, Tex.

[73] Assignee: The United States of America as representd by the Administrator of the National Aeronautics and Space Administration, Washington, D.C.

[21] Appl. No.: 629,360

[22] Filed: Apr. 5, 1996

[51] Int. Cl.$^6$ .................................................. G11B 7/00
[52] U.S. Cl. .............................. 369/103; 369/94; 369/112
[58] Field of Search .............................. 369/103, 84, 112

[56] References Cited

U.S. PATENT DOCUMENTS

| | | | |
|---|---|---|---|
| 3,697,149 | 10/1972 | Van Heeckeren et al. | 369/103 |
| 4,877,297 | 10/1989 | Yeh | 359/11 |
| 5,075,800 | 12/1991 | Hasman et al. | 359/15 |
| 5,119,214 | 6/1992 | Nishii et al. | 359/9 |
| 5,148,157 | 9/1992 | Florence | 359/318 |
| 5,194,971 | 3/1993 | Haines | 359/9 |
| 5,199,088 | 3/1993 | Magel | 385/18 |
| 5,237,433 | 8/1993 | Haines et al. | 359/9 |
| 5,328,853 | 7/1994 | Huber et al. | 437/3 |
| 5,361,149 | 11/1994 | Hasegawa et al. | 359/9 |
| 5,379,358 | 1/1995 | Blyler, Jr. et al. | 385/16 |
| 5,416,618 | 5/1995 | Juday | 359/247 |
| 5,426,521 | 6/1995 | Chen et al. | 359/9 |
| 5,523,993 | 6/1996 | Freeman | 369/103 |
| 5,615,186 | 3/1997 | Rosen et al. | 369/103 |
| 5,636,190 | 6/1997 | Choi | 369/94 |

OTHER PUBLICATIONS

Damman et al., "High efficiency in–line multiple imaging by means of multiple phase holograms", *Opt. Comm.*3, 312–315(1971).

Mait, "Understanding diffractive optic design in the scalar domain", *JOSA* vol. 12, #10, 2145–2158 (1995).

Zaleta et al., "Design methods for space–variant optical interconnections to achieve optimum power throughput", *Appl. Opt.* vol. 34, #14, 2436–2447 (1995).

Yamuzaki et al, "Holographic switch with a ferroelectric liquid–crystal spatial light modular for a large–scale switch", *Appl. Opt.* vol. 34, #35, 8137–8143 (1995).

Juday et al, Relaxation method of compensation in an opticcal correlator, *Optical Engineering*, vol 26, #11, 1094–1101 (1987).

(List continued on next page.)

*Primary Examiner*—Georgia Y. Epps
*Assistant Examiner*—Kim-kwok Chu
*Attorney, Agent, or Firm*—James M. Cate

[57] ABSTRACT

An apparatus is disclosed for reading and/or writing information or to from an optical recording medium having a plurality of information storage layers. The apparatus includes a dynamic holographic optical element configured to focus light on the optical recording medium, a control circuit arranged to supply a drive signal to the holographic optical element, and a storage device in communication with the control circuit and storing at least a first drive signal and a second drive signal. The holographic optical element focusses light on a first one of the plurality of information storage layers when driven by the first drive signal on a second one of the plurality of information storage layers when driven by the second drive signal. An optical switch is also disclosed for connecting at least one light source in a source array to at least one light receiver in a receiver array. The switch includes a dynamic holographic optical element configured to receive light from the source array and to transmit light to the receiver array, a control circuit arranged to supply a drive signal to the holographic optical element, and a storage device in communication with the control circuit and storing at least a first drive signal and a second drive signal. The holographic optical element connects a first light source in the source array to a first light receiver in the receiver array when driven by the first drive signal and the holographic optical element connects the first light source with the first light receiver and a second light receiver when driven by the second drive signal.

17 Claims, 10 Drawing Sheets

OTHER PUBLICATIONS

Juday, "Optimal realizable filters and the minimum Euclidean distance principle", *Appl. Opt.* vol. 32, #26, 5100–5111 (Sep. 10, 1993).

Soutar et al, "Complex characterization of the Epson liquid crystal television", *Proc. SPIE* 1959, Orlando, (Apr. 1993).

Gerchberg et al, "A practical algorithm for the determination of phase from image and diffraction plane pictures", *OPTIK* vol. 35, #2, 237–246 (1972).

Kedmi et al, "Optimized holographic optical elements", *JOSA–A* vol. 3, #12, 2011–2017 (1986).

Abramowitz et al, *Handbook of Mathematical Formulas*, U.S. Dept. of Commerce, 7$^{th}$ printing, pp. 300–302 (1968).

Goodman, *Introduction to Fourier Optics*, McGraw-Hill, pp. vii, 30–75, New York (1968).

Barton et al, MEDOF: version 2.0, *Proceeding of the SPIE*, vol. 2490, Orlando, Apr. 1995.

Richard D. Juday, "HOLOMED—An algorithm for computer generated holograms," *Proc. SPIE*, v2752, Orlando, Apr. 1996.

Kanghua Lu, et al, "Theory and design of the liquid crystal TV as an optical spatial phase modulator," *Optical Engineering*, vol. 29 #3, Mar. 1990.

Gary Blough, et al, "Hybrid lenses offer high performance at low cost, " *Laser Focus World*, 67–72, 74, Nov. 1995.

APPARATUS AND METHOD FOR FOCUSING A LIGHT BEAM IN A THREE-DIMENSIONAL RECORDING MEDIUM BY A DYNAMIC HOLOGRAPHIC DEVICE

ORIGIN OF THE INVENTION

The invention described herein was made by an employee of the United States Government and may be manufactured and used by or for the government of the United States of America for governmental purposes without the payment of any royalties thereon or therefor.

FIELD OF THE INVENTION

The invention relates to modulation of light. More particularly, the invention relates to method and apparatus for modulating light using spatial light modulators.

BACKGROUND OF THE INVENTION

Modern communication systems frequently use light carriers because of the very large bandwidth inherent in light signals. In order to be able to use light as a carrier, however, it is necessary to build switches that can make the necessary connections between source and destination of the signal. For example, the switches must be able to connect an arbitrary one of a plurality of light sources to an arbitrary one of a plurality of light receivers. Also, switches must be available for "fan-out" or "broadcast" applications in which a single source serves a number of receivers. Further, switches must be available to handle the reciprocal function of "fan-in", in which a single receiver accepts signals from a plurality of sources. Practical applications of such switches include "subscriber network" switching of optical broad band signals. In subscriber network switching, in either fan-out or fan-in switch configurations, a large number of connections must be made but the reconfiguration time need not necessarily be short. Another application is the "trunk network" switch, in which the number of connections is relatively small, but the connections must be reconfigured quickly. There exists a need for an optical switch that has improved efficiency and switching speed.

One example of a known system for switching light signals is illustrated in FIG. 1. In this example, two light signals are received from an array 11 of fiber optic light sources. Decoder 13 receives the signals and decodes the light signals into electrical signals, which are then transmitted to a conventional electrical block switch 15. The switch 15 directs the received electrical signals to the desired outputs, and applies the electrical signals to encoder 17. Encoder 17 then re-encodes the signals and applies light signals to the desired receivers in array 19 of fiber optic receivers.

The system shown in FIG. 1 is sufficient to handle the basic requirements for switching light signals, but is relatively complex and does not take full advantage of the speed and bandwidth of using light for signal transmission.

Another well-known application for the use of light in information transmission is in the field of optical recording media. As shown schematically in FIG. 2, an optical element 21 is provided to focus a beam of light 23 at a desired location on an optical disk 25. The focal length of the optical element 21 is fixed, and indexing of the focal point on the optical disk is achieved by rotation of the disk and lateral movement of the optical element 21 in the direction shown by arrow 27. Recently, multilayer optical disks have been developed wherein information can be stored in multiple distinct layers within the optical disk. In the example shown in FIG. 2, three storage levels 25A, 25B, and 25C are shown. Thus, in order to focus the light beam 23 on the desired storage layer, in additional to horizontal movement the optical element 21 must be able to move perpendicular to the plane of the optical disk (in the direction shown by arrow 29) between locations 31A, 31B, and 31C. As a result, although multilayer optical disks have the potential for greatly increasing information storage capacity, this is achieved at the cost of greatly increased complexity of the mechanics required to move the optical element 21.

One potential solution to these and other similar problems encountered when using light as a carrier for information is through the use of holographic switching. Holographic optical elements can be used to connect light, for example, from a single source simultaneously to a number of destinations, and conversely from a plurality of sources to a single destination. Diffractive optics is the name of the relative discipline. Diffractive holographic optical elements (HOEs) may be static, such as those created on film, or they may be dynamic, such as those implemented using spatial light modulators (SLMs). Dynamic HOEs have the obvious advantage over static ones in that the switch network may be reconfigured rapidly. However, some forms of static HOEs have the advantage of a larger domain of complex optical transmittance (i.e., the set of available combinations of time delay and absorptance) that they may assume. Dynamic HOEs such as SLMs typically have limited sets of complex values.

Following convention in the field of Fourier optics, the retardation and absorption of passive elements are represented by a complex phasor. High speed SLMs usually have a very limited set of complex values, and often are restricted to a binary set of values in the complex plane as illustrated in FIG. 3A. If speed requirements are decreased, SLMs are available in the ternary configuration (having a set of three complex values) illustrated in FIG. 3B, and with a curvilinear continuum of complex values as illustrated in FIG. 3C. In addition, U.S. Pat. No. 5,416,618 to Juday describes how to create a "full complex" SLM with a wider range of values as illustrated in FIG. 3D. Ordinarily, however, a continuously variable SLM is restricted to, at most, a curvilinear subset of the complex unit disk (e.g., FIG. 3C).

One of the design objectives of HOEs has been to produce spot arrays, which are applicable to the type of switching shown in FIG. 1. Damman et al. have demonstrated how to compute a fixed holographic grating that disperses light into several diffraction orders, with controllable distribution of light among the orders. H. Damman et al. "High efficiency in-line multiple imaging by means of multiple phase holograms", *Opt. Comm.* 3, 312–315 (1971). Overviews of the theoretical state of the art and diffractive optic element design are found in the special issue of *Applied Optics* (10 May, 1995) and in J. Mait, "Understanding diffractive optic design in the scalar domain", *JOSA* 12, 2145–2158 (1995). Fresnel zone lenses implemented in binary phase are a well-known concept (see, e.g., D. Zaleta et al., "Design methods for space-variant optical interconnections to achieve optimum power throughput", *Appl. Opt.* 34, 2436–2447 (1995)), but they tend to have low diffraction efficiency and/or diffraction artifacts.

Use of an SLM for a large-scale switch is described in H. Yamuzaki et al., "Holographic switch with a ferroelectric liquid crystal spatial light modulator for a large-scale switch", *Appl. Opt.* 34, 8137–8143 (1995) . However, the Yamuzaki switch is complicated, especially when compared with a simple Fresnel zone lens that can in principle be implemented on a single SLIM using binary phase. In theory, an SLM having more complex values available to it than two should be able to perform better as the equivalent of a Fresnel zone lens than a SML restricted to binary values. However, the coupling between the amplitude and phase of an SLM's operating curve has been difficult to accommodate in known optimization procedures for generating the necessary drive signal.

Annealing techniques such as those described by R. Juday et al., "Relaxation method of compensation in an optical correlator", *Optical Engineering* 26, 1094–1101 (1987) created optimum solutions to related optics problems, but are very computation intensive.

More recently, a method has been devised that can be generalized to optimize a metric whose value is in monotonic relation to the quality with which an HOE will perform an optical switch function. R. Juday, "Optimal realizable filters and the minimum Euclidean distance principle", *Appl. Opt.* 32, 5100–5111 (Sept. 10, 1993). The drive signal for the HOE can be computed for the curvilinear continuum of complex values typical of readily available SLMs such as the Epson brand liquid crystal television modulators. C. Soutar et al., "Complex characterization of the Epson liquid crystal television", *Proc. SPIE* 1959, Orlando, (April 1993). Despite these advances, conventional HOE computation techniques are often iterative. The Gerchberg-Saxton routine described in R. Gerchberg et al., "A practical algorithm for the determination of phase from image and diffraction plane pictures", *OPTIK* 35, 237–246 (1972), simulated annealing, and POCS (projection onto convex sets) method are examples of this. These iterative routines are not guaranteed to converge in a stated amount of time, and there is a tendency for them to become trapped in local maxima of design criteria.

A spatial light modulator can be generally characterized as a reconfigurable optical element. SLMs are available in both electrically-addressable (EASLM) and light-addressable (LASLM) configurations. Operation of a typical EASLM is illustrated in prior art FIG. 4. In this illustration, a coherent input wavefield 33 is applied to SLM 35. Control device 37 applies a control signal to the SLM 35 to produce a desired output waveform 39. Difficulty has been encountered in the prior art, however, in producing accurately the desired output waveform with acceptable amplitude. Error in the output waveform is caused both because of the non-ideal nature of the SLM 35 itself, and also because of the complex interdependence of the phase and amplitude components of the waveform (explained in more detail below) which both complicates and limits the realizable values of the SLM. The result of this, as shown in the figure, is that while desired output waveform 39 is the waveform shown by solid lines, the output waveform actually produced by the SLM 35 is the waveform shown by dotted lines. In the prior art, minimizing this error to an acceptable level has meant unacceptably low levels of output intensity. Optimized solutions with very little error have such low throughput as to be commercially useless. On the other hand, when throughput is been maintained at an acceptable level, error has increased to unacceptable levels.

As noted previously, one problem with conventional optimization techniques has been inability to deal with the interdependence between phase and amplitude in the complex plane. For example, in Kedmi et al., "Optimized holographic optical elements", *JOSA-A* 3, 2011 (1986), an error function is described that is a measure of phase error, not complex electromagnetic error. As a result, Kedmi et al. design a phase holographic optical element without taking into account the whole complex nature of the modulation. On the converse side of this, there are references such as U.S. Pat. No. 5,199,088, which disclose an interconnection method using only amplitude. The method described in this patent neither uses nor needs phase information. None of these references have effectively addressed the full complex nature of the waveform nor dealt with the previously sticky issue of interdependence between phase and amplitude actions.

SUMMARY OF THE INVENTION

In one aspect, the invention relates to an apparatus for communicating with an optical recording medium having a plurality of information storage layers, which apparatus comprises a dynamic holographic optical element configured to focus light on the optical recording medium; a control circuit arranged to supply a drive signal to said holographic optical element; and a storage device in communication with said control circuit and storing at least a first drive signal and a second drive signal; wherein said holographic optical element focusses light on a first one of the plurality of information storage layers when driven by said first drive signal and said holographic optical element focusses light on a second one of the plurality of information storage layers when driven by said second drive signal.

Another aspect of the invention relates to a method for communicating with an optical recording medium having a plurality of information storage layers using a dynamic holographic optical element configured to focus light on the optical recording medium, which comprises storing at least a first drive signal and a second drive signal in a local storage device; driving the dynamic holographic optical element with said first drive signal to cause said holographic optical element to focus light on a first one of the plurality of information storage layers; and driving the dynamic holographic optical element with said second drive signal to cause said holographic optical element to focus light on a second one of the plurality of information storage layers.

A further aspect of the invention relates to an optical switch for connecting at least one light source in a source array to at least one light receiver in a receiver array, which comprises a dynamic holographic optical element configured to receive light from said source array and to transmit light to said receiver array; a control circuit arranged to supply a drive signal to said holographic optical element; and a storage device in communication with said control circuit and storing at least a first drive signal and a second drive signal; wherein said holographic optical element connects a first light source in said source array to a first light receiver in said receiver array when driven by said first drive signal and said holographic optical element connects said first light source with said first light receiver and a second light receiver when driven by said second drive signal.

A further aspect of the invention relates to a method of connecting at least one light source in a source array to at least one light receiver in a receiver array using a dynamic holographic optical element configured to receive light from said source array and to transmit light to said receiver array, which comprises storing at least a first drive signal and a second drive signal; driving the holographic optical element with said first drive signal to cause optical connection between a first light source in said source array and a first light receiver in said receiver array; and driving the holographic optical element with said second drive signal to cause connection between said first light source and said first light receiver and a second light receiver.

DETAIL DESCRIPTION OF THE PREFERRED EMBODIMENTS

Preferred embodiments of the invention will be described below with reference to the accompanying figures.
Use of a Liquid Crystal Spatial Light Modulator to construct a computer generated hologram An SLM processes an arriving planar coherent lightwave into a different complex lightwave. If the lightwave from an object we would like to see is known, it is possible to use an SLM to construct that desired lightwave without that object actually being in existence. The term "construct" is used rather than the term "reconstruct" ordinarily used in holography, because the lightwave departing the SLM does not mimic one that ever physically existed. The situation is analogous to film holography, except that: 1) a computed lightwave is constructed rather than a physical precedent; 2) the hologram is more like a kinoform than a hologram created using a reference; and 3) an SLM is limited (compared with film) in its spatial resolution and in the complex values it can assume. The SLM's hologram is electronically controllable in a manner not possible with film holography. In accordance with the invention, a metric has been devised of the hologram quality with which the drive signal for the SLM can be optimized using optimal filter theory. Although the embodiments that follow discuss the use of transmissive SLMs, the invention is equally applicable to reflective SLMs.

Computer generated holographs have many practical applications including head-up displays, holographic video movies, and the like. One particularly important application is to the aerospace and robotics industries. For example, astronauts and others wearing helmets often need visual display of information, and there is usually limited space in which to construct the display. Display systems that can render three-dimensional objects offer significant advantages over two-dimensional displays for certain types of information. Holographic displays serve both requirements; small display volume and real three-dimensional viewed objects.

Figure 5A:
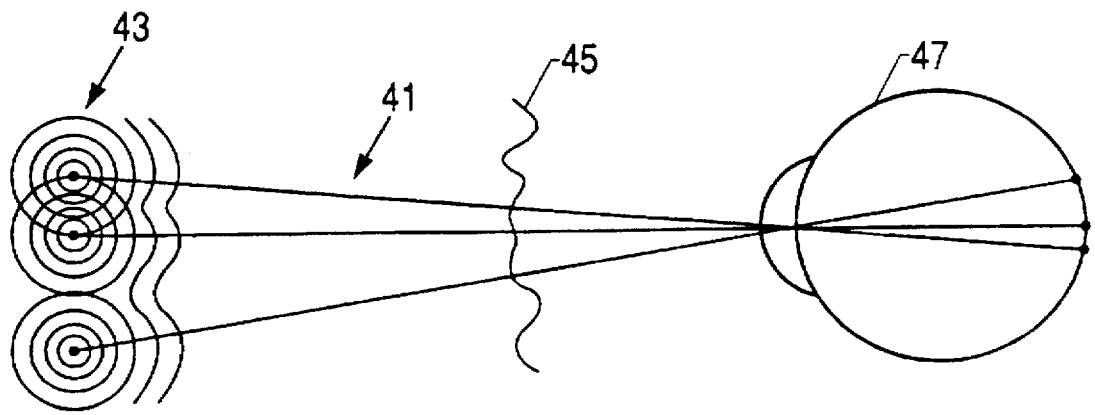
FIGS. 5a–5b are schematic diagrams illustrating construction of computed wavefront in accordance with one embodiment of the invention.
Figure 5B:
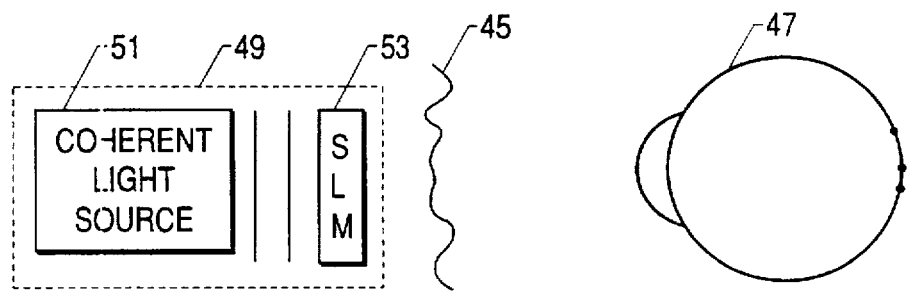

One practical application of the computer generated holographic image is illustrated in FIGS. 5a and 5b. In FIG. 5a, light 41 from an actual source object 43 creates a complex waveform 45 that is received by the eye 47. In FIG. 5b, a holograph generation device 49, which is preferably mounted within a helmet or in another appropriate location to allow display to the user, includes a coherent light source 51, and an SLM 53. Source 51 applies coherent light to SLM 53, which modulates the coherent light to produce the same complex waveform 45 that was produced by the actual objection in FIG. 5A. The same image is then received by the eye 47 in FIG. 5B as was received by the eye 47 in FIG. 5A.

Holographic images with true parallax provide a high quality image that can be observed for long periods of time without the discomfort that sometimes occurs in conventional stereograms. Furthermore, a single hologram can replace a complex optical system and can reduce the weight and the number of optical components. Compact lightweight optical systems are the key to building practical head-mounted display systems that are attractive for helmeted use. Holographic displays can simultaneously incorporate the optics and the imaging device in a single element. The ideal holographic display is a high resolution (on the order of $10^3$ lines/mm) spatial light modulator (SLM) with real-time imaging capability. This resolution gives the capability to construct near-field (Fresnel) holograms.

The great majority of ferro-electric liquid crystal SLMs have become available with resolutions on the order of $10^2$ lines/mm, and they are capable of better than television frame rates. The embodiment that follows, however, was implemented using lower-cost liquid crystal televisions (LCTVs). The LCTV has video rate capability but its resolution is low (on the order of 10 lines/mm). This is not a problem for small (on the order of a millimeter) low resolution objects whose virtual images are on the order of a meter behind the hologram plane. Even within these constraints, it is possible to produce good quality holograms well within the Fresnel regime. A single drive signal determines both amplitude and phase. Since they are not independently controllable, it is necessary to deal with the issue of optimizing (in some sense) the hologram based on this constraint. The objective is to create an electric field that will give a visual impression of seeing a specified self-luminous geometrical object.

Most of the past work inputting fields for computer generated holograms is associated with farfield or Fourier transform holograms. This is primarily due to the low resolution of SLMs available and the low resolution requirements of Fourier transform holograms. There is not a significant corresponding body of work on nearfield computer generated holograms. The general problem for calculating the nearfield for an arbitrary object source is not too difficult for planar objects where the problem can be posed as a linear filter problem as described in J. Goodman, *Introduction to Fourier Optics*, McGraw-Hill, New York (1968). In this case the solution can be implemented on a computer where the efficiencies inherent in the fast Fourier transform can be exploited. For three dimensional objects it is often more efficient to describe the object as a collection of elemental objects such as points, lines, rectangular apertures, etc., and use the superposition of elemental fields to find the object field. This approach has been used in this embodiment, and approximations have been introduced that lead to separability of mathematical operations in the x and y directions. Although not crucial to the invention, these approximations are computationally convenient. The resulting separability is inherent in field calculations for rectangular apertures and point objects modeled with quadratic approximations. This results in an efficient outer product formulation that is easy to implement.

Objects are defined herein as collections of rectangular apertures or as collections of point sources. The superposed fields for the elemental objects (rectangular apertures or point sources) determine the total field for each object. Using the paraxial approximation it is possible to define the field as separable components in the x and y directions. This permits determining fields using an outer product formulation that codes fairly efficiently using high level languages or routines that manipulate matrix structures.

In the case of rectangular objects, the fields for the rectangles are estimated using small angle (quadratic) approximations and formulated in terms of separable Fresnel integrals. The phasor field for a single rectangular aperture assumed to be transilluminated by a plane wave (or self-luminous with a uniform field across the aperture) is:

$$U(x_o, y_o) = A \frac{e^{jkz}}{j\lambda z} \int_{-x_{lc}}^{x_{uc}} e^{j\frac{k}{2z}(x_1-x_o)^2} dx_1 \int_{-y_{lc}}^{y_{uc}} e^{j\frac{k}{2z}(y_1-y_o)^2} dy_1 \quad (1)$$

Here $x_o, y_o$ are the coordinates of point at which the field is desired, A is a constant, z is the distance to the observation point from the plane of the rectangular aperture, $\lambda$ is the wavelength and k is the propagation constant $2\pi/\lambda$. The limits of the integrals $x_{lc}, y_{lc}$, and $x_{uc}, y_{uc}$ are the coordinate pairs of the lower left corner and the upper right corner of the rectangular aperture. The integrals in Eg. (1) can be redefined in terms of $\eta, \xi$ with a change of variables defined by the following relations:

$$\frac{\pi}{2} \xi^2 = \frac{k}{2z} (x_1 - x_o)^2 \quad (2)$$

$$\frac{\pi}{2} \eta^2 = \frac{k}{2z} (y_1 - y_o)^2$$

This gives:

$$U(x_o, y_o) = A \frac{e^{jkz}}{2} \int_{-\xi_1}^{\xi_2} e^{j\frac{\pi}{2}\xi^2} d\xi \int_{-\eta_1}^{\eta_2} e^{j\frac{\pi}{2}\eta^2} d\eta \quad (3)$$

The integrals in Eg. (3) are the complex form of the tabulated Fresnel integrals. Pade approximations to the Fresnel integrals are known. The approximation by Hastings (M. Abramowitz et al., *Handbook of Mathematical Formulas*, U.S. Dept. of Commerce, 7th printing, pg. 300 (1968)) can be used to estimate the integrals and to calculate the fields when rectangular apertures are used.

In the embodiment described below, the source is taken to be a set of points, whose individual fields are coherently summed. This is particularly appropriate for the optical switch application of the invention described in detail below. For a single point at $(x_1, y_1)$ the integral is replaced by the integrand's values for $\xi(x_1)$ and $\eta(y_1)$ if the paraxial approximation is being used.

The approximation in Eg. (2) is also the product of a function of x alone and a function of y alone. This means that the field value at a set of discrete coordinates $(x_o, y_o)$ is the product of two numbers, where each number represents the results of calculating one of the integrals above if rectangular apertures are used (assuming of course that the A exp(jkz)/2 term is lumped in with one of the integrals). If a point source approximation is used, the integrand is mathematically impulsive. Thus it is possible to represent the results for a two dimensional array of points as an outer product of two vectors, with each vector representing a one-dimensional sequence of integral values. This allows fairly efficient code for the field calculations.

$$U_p(s_o, y_o) = \frac{A e^{jk[(x_o-x_1)^2+(y_o-y_1)^2+(z_o-z_1)^2]}}{\sqrt{(x_o-x_1)^2 + (y_o-y_1)^2 + (z_o-z_1)^2}} \quad (4)$$

If one assumes that the point source is located near the z-axis and that the point observation makes small angles with respect to the z-axis, then the field may be approximated as:

$$U(x_o, y_o) = \frac{A}{z} e^{j\frac{k}{2z}(x_o-x_1)^2} e^{j\frac{k}{2z}(y_o-y_1)^2} \quad (5)$$

The separability of the quadratic approximation implies that an outer product formulation is possible.

Figure 6:
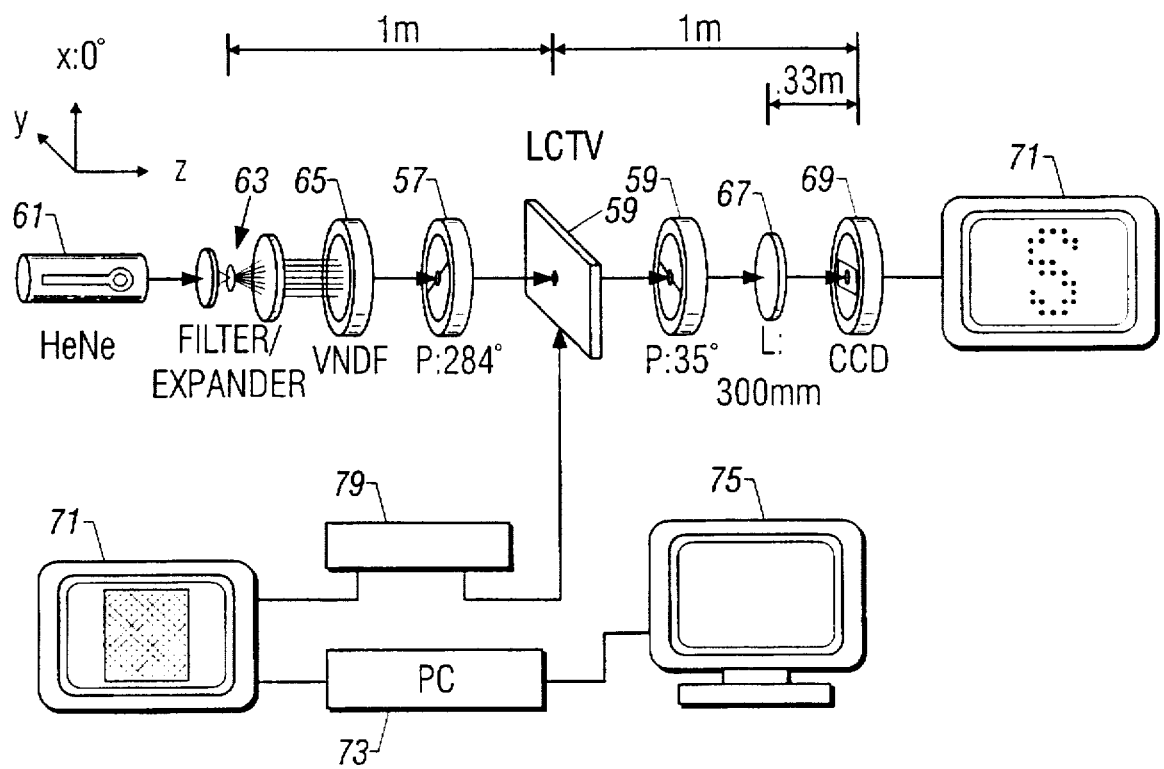
FIG. 6 illustrates a system for generating a holographic image in accordance with an embodiment of the invention.

Before an SLM can be used to best effect, its complex transmittance as a function of drive voltage must be determined by laboratory measurement. As shown in FIG. 6, the LCTV 55 is a birefringent SLM, so it is ordinarily operated between two polarizers 57, 59, whose polarizing and analyzing states (or angles, if linear polarization is used) then determine the SLM's operating characteristics. Each combination of polarizer states determines a unique SLM operating curve. The gamut of operating curves ranges considerably and includes highly coupled, phase-mostly and amplitude-mostly curves (Soutar et al., supra.). But in all cases the phase and amplitude are not independent; they are controlled by a single signal, a grey level value in a video signal. To assure high light throughput and a bright image, the polarizers are set for phase-mostly operation (for example, polarizer 57, p:284°; polarizer 59, P:35°). This may not necessarily be the best choice of SLM curve in terms of image quality but would assure that the image is easy to locate.

One method of determining the SLM's operating curve is based on distinct measurements of the amplitude and phase characteristics as a function of grey level value (the particular method by which the operating curve is determined is not crucial to the invention). The amplitude transmittance may be determined from intensity transmittance measurement of a helium-neon laser beam generated by laser 61 passing through the LCTV. The relative phase transmittance is inferred from fringe shift measurements made with a grating interferometer. This approach is described in detail in Soutar et al., supra. The shift measurements are made from framegrabbed images of fringes. In the past, ad-hoc techniques requiring a mix of computer analysis and human intervention were used to determine the shifts by examining null positions in the pattern. Because the patterns are noisy and are not uniform in amplitude variation across the fringe image, the null position can be difficult to define. This required determining null neighborhoods by eye, and then using the computer to fine tune the search process. In accordance with this invention, a new approach is used that avoids the search process.

Software may be used to carry out the fringe analysis completely without human intervention. The fringe periodicity and the shift are determined using correlation. The correlations produce fairly smooth curves with clearly defined maxima and minima. This permits using simple incremental searches to establish maxima and minima. The fringe pattern with the greatest contrast is used as a base against which to correlate other shifted patterns. The proper scale relation between fringe shift and phase shift is determined by an accurate measurement on the periodicity of fringe patterns. The average periodicity from the autocorrelations of all the fringe patterns gives a good estimate of the period. The shift in the peaks (global maxima) of the cross-correlation of all the patterns with the reference fringe pattern determines the relative phase shift. The technique works well with noisy fringe data with only one caveat. The non-uniformity in the fringe contrast sometimes results in large jumps of nearly one period in the peak position due to small differences in local maxima. This may be fixed by linearly interpolating phase shifts where large jumps occur. The phase estimates produced by the fringe data, along with amplitude transmittance data determined by intensity measurements, produce the operating curve in the complex plane. Any value on this complex curve could be realized by assigning its corresponding grey scale value to the pixel. The grey scale values are assigned on a pixel basis in the LCTV.

It is best if the grey level values can be written to the LCTV with a framegrabber that maps grey level values one to one from framegrabber coordinates to LCTV pixels. Most currently available EALSMs are sold with direct pixel control. However, in the embodiment described below, this was not the case for the particular hardware employed. The Matrox (available from Matrox Inc., 1055 Regis Blvd., Dorval, Quebec, Canada H90P2T4) PIP framegrabber used for writing to the LCTV requires a 512×512 array of grey level values from which a video signal is synthesized for the LCTV. Only a portion of the PIP array values are mapped to the active pixels on the LCTV. The LCTV used in this embodiment was a liquid crystal pixellated array taken (together with its drive circuitry) from an Epson "Crystal Image" television projector. The mapping from framegrabber coordinates to pixel coordinates is complicated because one does not necessarily know the timing details for line writes from the framegrabber board to the LCTV. One does know that the LCTV overwrites pairs of lines from the framegrabber to the LCTV. This means that 440 video lines from the framegrabber are mapped into 220 rows of pixels on the LCTV. This is accommodated by writing duplicate rows in the framegrabber. But determining where the video line starts is a much more challenging issue. To good accuracy there exists an affine relationship between framegrabber coordinates (array indices in the framegrabber) and pixel center values. The mapping yielded the following affine (straight line) relation between PIP pixel coordinates and LCTV coordinates:

$$t = 1.522u + 21.621 \quad (6)$$

where t and u are PIP and LCTV pixel coordinates respectively.

Figure 7:
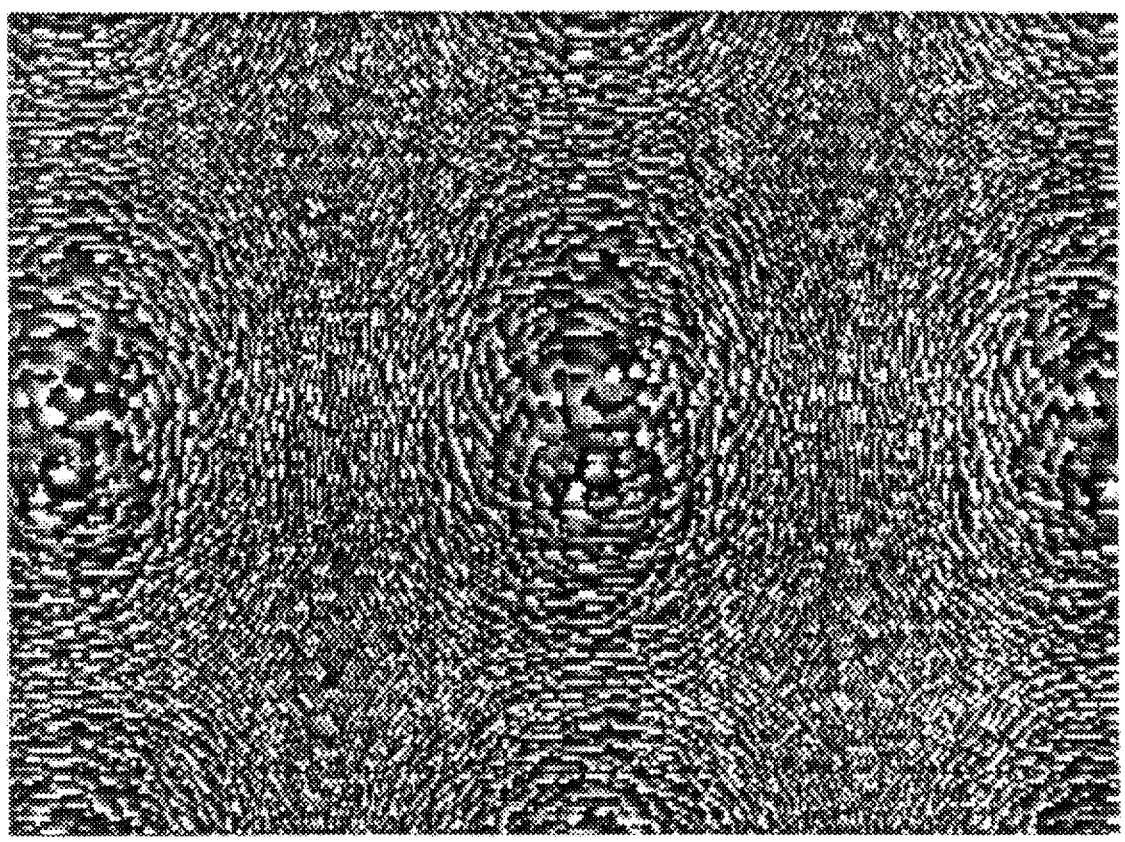
FIG. 7 illustrates a gray-level drive map that produces the complex holograph for locations in the shape of the letter "S" in accordance with an embodiment of the invention.

The equation assumes that the first pixels in a row are at 0. It can be used to remap the array coordinates of the output from the software to pixel coordinates in the PIP. Once this inverse mapping of the desired LCTV values is determined, it is easy to determine the corresponding grey levels at pixel coordinates within the PIP. These remapped coordinates are typically "virtual" since only integer coordinate values can be realized within the framegrabber. This requires that the remapped values be interpolated using to get the actual values written to the PIP video drive board. The drive values passed to the 512×512 storage locations on the PIP board are shown in FIG. 7. The black border results because not all locations on the PIP board are represented on the LCTV.

Optimality for the video hologram is easy to state. The objectives are to have a lot of light to pass through the SLM and for the light to look like the object. These are not, of course, precisely compatible objectives. If one regards only the former, then the choice of SLM drive value is always the one that produces the largest amplitude transmittance. That clearly does not ordinarily create the object lightwave. (An exception occurs when the SLM's operating curve is phase-only, in which case the amplitude is constant and phase freedom can be used to create the object lightwave).

The objective of similarity requires attention. All passive SLMs have operating curves that lie within (or on) the unit disk in the complex plane as shown in FIGS. 3A–3D. To some degree, when describing the similarity between objective and created lightwaves, one is not concerned with the energy in either lightwave. Take for example an operating curve that is fully complex in a very small disk around the complex origin, while having spiral arms that extend to near-unity radius. Would one use the full complexity of the central region, and accept the very dim but highly accurate construction? Or would one use the arms of the operating curve and accept the inaccurate, but bright, construction? The answer involves the detectability of the constructed lightwave in the system it lies in. That detectability is influenced by the background light and things that look like it in the detection process. In accordance with the invention, a ratio metric is formed that accommodates those comprehensive considerations. However, in the computations whose results shown here, it is assumed that the background is zero.

Once an object's complex hologram has been calculated, the field must be optimally created using the characteristics of the LCTV. "MEDOF", commercially available software available under NT Control number MSC-22380 from COSMIC (Computer Software Management Information Center) at the University of Georgia, can be modified in accordance with the procedures below to optimize the construction of the computed wavefront. The fitting process is carried out by maximizing the ratio of the light energy passed by the hologram to the summed squared error in the transmitted wavefront. The passed energy is computed by squaring the magnitude of the complex transmittance of each pixel, and summing over the pixels. The error is computed by acquiring at each pixel the Euclidean distance in the complex plane between the desired complex transmittance and the nearest realizable transmittance of the LCTV, and summing over the pixels. In the described embodiment, no corrections were made for nonuniformity of the illuminating beam. The computed wavefront is allowed to change value by a complex constant in the optimization procedure, on the prospect that such a change is meaningless to the visual display. In this way a comparatively bright constructed image is obtained with comparatively little error. The resulting image of LCTV drive values for points arranged in the shape of a letter "S" is shown in FIG. 7.

Figure 8:
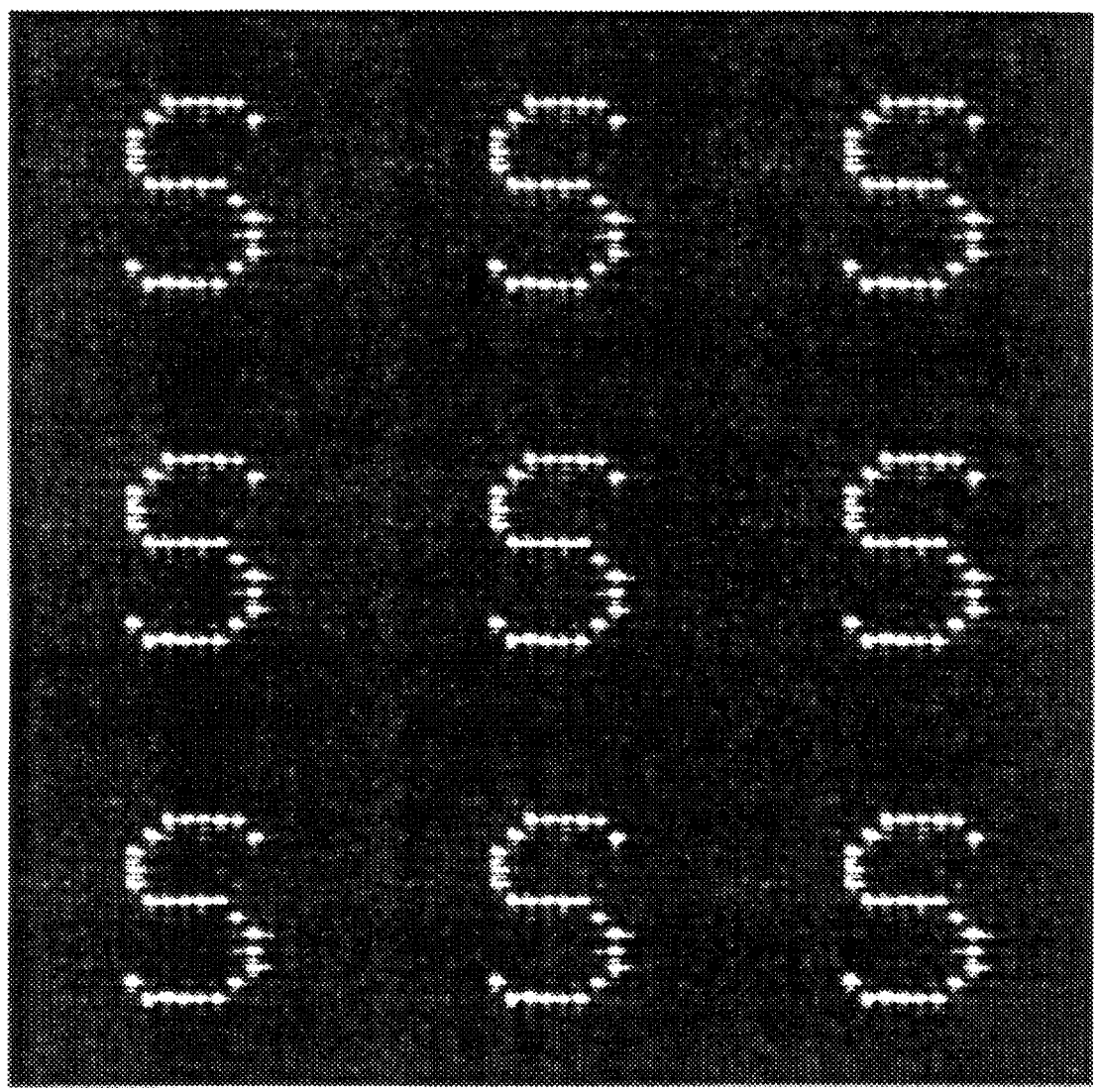
FIG. 8 illustrates the holographic image produced by the drive map of FIG. 7.

A diagrammatic representation of a system to produce the grey-level drive map shown in FIG. 7, and ultimately the complex holograph for points arranged in the shape of the letter "S" shown in FIG. 8, is illustrated in FIG. 6. As mentioned previously, the helium neon laser 61 is provided to supply a coherent source of light in the z direction as shown in the figure. The coherent light from laser 61 is provided to a filter/expander 63, which in turn applies the expanded beam to variable neutral density filter (VNDF) 65. Light from VNDF 65 is applied to the first polarizer 57, and then to the LCTV 55. The transmitted modulated waveform from LCTV 55 is passed through polarizer 59, through lens 67 to CCD camera 69. The holographic image of dots arranged in the shape of the letter"S", is then produced on a display 71. Generation of the grey-level drive map shown in FIG. 7 is achieved using a personal computer (PC) 73 and associated monitor 75. The PC 73 incorporates a MATROX PIP framegrabber. The grey-level drive map 77 produced by the PC 73 is then applied to LCTV 55 using standard Epson drive electronics 79 associated with the Epson LCTV 55.

For the LCTV, a 220(rows)×320 array of grey level values ranging from 0 to 255 was produced. These grey level values are written to the LCTV via the MATROX framegrabber as described above. The procedure depends on each pixel's hitting its prescribed value, necessitating the pixel level control of the modulator as described previously. However, generally an EASLM can be procured with direct control for each pixel, thus making this straightforward.

The true test of all the measurements and the methodologies used to calculate fields and optimally realize them on the LCTV is the quality of the resulting images produced by holograms written on the LCTV. FIG. 8 is based on a collection of point sources placed in the shape of the letter "S".

The virtual image on the LCTV was calculated to be points arranged in the shape of an "S" that was 6 mm high and one meter behind the LCTV. Computations assumed that the hologram would be illuminated with a collimated beam from the helium-neon laser 61 ($\lambda$=0.6328 microns). The 300 mm lens (providing a desired degree of magnification) was placed between the LCTV and the CCD imager to capture a real image of the virtual "S". Multiple images of the "S" are observed, owing to the discrete grating structure of the LCTV, with the zero order just to right of center of the Figure. Diffraction from the pixel structure of the LCTV affects the quality of the letters, more strongly in the horizontally displaced replicates than in the vertical. Using the full Fresnel diffraction accuracy rather than the paraxial approximation may serve to reduce these effects, at the expense of increased computation. In practical applications, higher space bandwidth product of the SLM will displace the non-zero orders entirely out of the field of view. The size of the spots making up the "S" are presumed to be near the diffraction limit of the imaging system. The produced image is persuasive that arbitrary patterns of spots can be created. In fact, some care must be taken to avoid resampling-induced moiré patterns between the imaged virtual spots and the CCD imager.

Generation of the Optimization Metric

In accordance with the invention, a metric has been devised that measures how well the transmittance pattern on the SLM matches the design requirements of the objective ideal HOE. As explained above, the basic steps of this process include computing a complex transmittance pattern that would exactly meet the object requirements for the HOE, designing the metric, and configuring the SLM to optimize the metric. Designation of the metric and configuration of the SLM to optimize the metric are described below.

The ideal complex transmittance pattern is the one that would convert the lightwave arriving at the SLM into the lightwave desired leaving the SLM and with the least possible loss of light energy. The ideal transmittance is computed as the complex ratio of the phasors representing these two lightwaves. Although the input waveform used in the preceding embodiment was a simple coherent wave, this need not be the case. The metric and optimization procedure are sufficiently robust to generate the desired output waveform regardless of the nature of the input. Thus, the input may be from a single point source, from a plurality of point sources, or from any other combination of elements. It is also possible to use the metric and the optimization technique to correct for non-ideal characteristics of the SLM itself. Similarly, with respect to the output waveform, the metric and optimization method allow use of the SLM to produce a dot output at a desired focal length, a multiple dot output having the same or different focal depths, or any other realizable output.

Turning now to generation of the metric itself, the process begins with imagining a set of pixels, each of which has complex transmittance values restricted to some subset of the unit disk in the complex plane (see FIGS. 3a–3d). Previous methods of determining an optimal realizable value of the complex transmittance for each pixel have often concentrated on reducing the whole-set error between a computed ideal value z of the transmittance and the realized value r.

That is, the set of values is chosen that minimizes the error metric $\mathscr{E}$ in $$\mathscr{E}^2 = \sum_{\text{pixels}} |Z - r|^2. \qquad (7)$$

In practice, a design freedom is often employed: an arbitrary complex constant, k, is introduced on the prospect that scaling the ideal values by a complex constant will have little effect on the quality of the resulting HOE. Then the following error metric is minimized by choice of k (a constant over all pixels) and the set of realized values r:

$$\mathscr{E}^2(k) = \sum_{\text{pixels}} |kZ - r|^2. \qquad (8)$$

The value for k is searched over, and for each k the set {r} that minimizes $\mathscr{E}(k)$ is selected. For binary SLMs, or those of constant amplitude and continuously variable phase, the method is acceptable. There is an unexpected consequence, however, of using this technique with coupled spatial light modulators. Suppose one is working with an SLM whose operating curve passes near or through zero. Suppose that k is chosen so small that z has a very small modulus. Then the selected set {r} also has a very small modulus, and a routine that minimizes $\mathscr{E}(k)$ by searching on k will select progressively smaller-modulus values of r—the procedure collapses to zero. The error has been made small, but at the expense of passing little energy through the modulator.

Rather than minimizing the error of approximating a computed ideal set of pixel values and thus sacrificing amplitude, the metric of the invention takes the full complex nature of the waveform into account. In its numerator is placed a product (or sum) of things to be maximized, and in the denominator, a product (or sum) of things to be minimized, in order to create a "good" HOE. Then {r} is selected to maximize the ratio metric. Since energy efficiency is a concern in signal transmission and reception, the overall passed energy of the metric in the numerator. Since the error is a thing we wish to minimize, is placed it in the denominator. The metric T is a function of k.

$$T(k) = \frac{\sum_{\text{pixels}} |r|^2}{\sum_{\text{pixels}} |kZ - r|^2} \qquad (9)$$

Then, as described in more detail in R. Juday, "Optimal realizable filters and the minimum Euclidean distance principle", Appl. Opt. 32, 5100–5111 (Sep. 10, 1993), the set {r} is selected that maximizes the ratio metric. The minimum-Euclidean distance principle follows from the maximization goal. That is, given a value for k, the value for r to choose at each frequency is the one closest by Euclidean measure to the associated k z. We then search over complex values k. The search for the phase of k is obviously limited by 0 and 2π. Similarly, the ideal value for the magnitude of k is within a large value that would put the minimum kz above the largest SLM magnitude, and a small value that would put the maximum k z below the smallest SLM magnitude. So we have a bounded search for k and a method of optimizing T(k), which jointly produce a global optimum value for T. Other methods may be used without departing from the scope of this invention.

Figure 9:
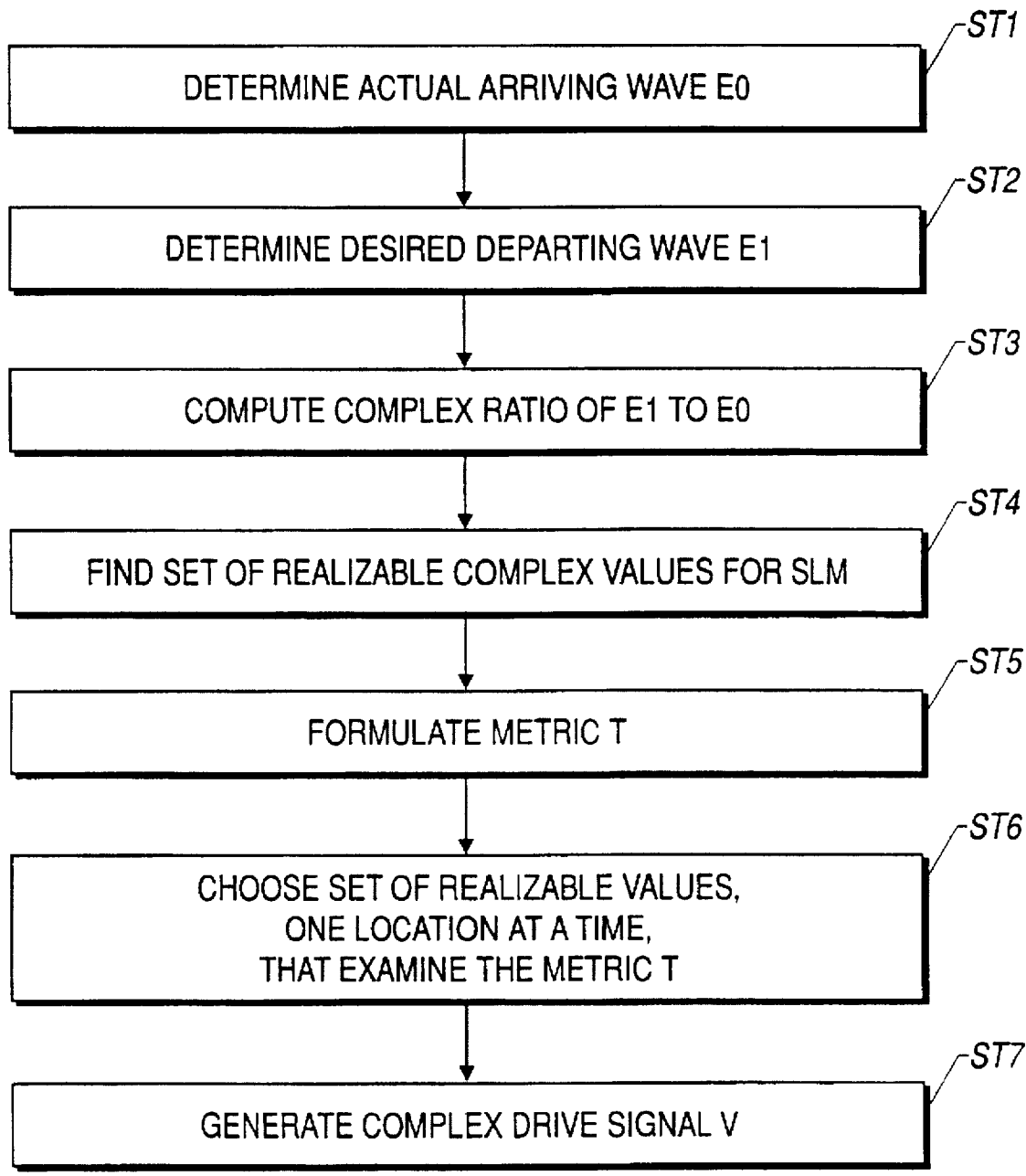
FIG. 9 is a flowchart illustrating generation of a drive signal in accordance with an embodiment of the invention.

The method described above is illustrated in the flowchart of FIG. 9. In step ST1, the actual arriving wave $E_0$ that lands on the SLM is determined. As noted above, this wave need not be uniform because the invention advantageously can correct for aberrant input waveforms and for less than ideal characteristics of the SLM. In step ST2, the desired departing wave $E_1$ is determined that would optimally be leaving the SLM. This can be done, for example, by computationally back-propagating a wave, or set of waves, that are to arrive at the action point or points. Subsequently, in step ST3, the complex ratio of $E_1$ to $E_0$ is computed. This is the ideal complex ratio z and may be arbitrarily large. If the value of z is truly infinite by virtue of $E_0$ being zero, it will be assumed for convenience that T has the phase of $E_1$ and infinite magnitude.

In step ST4, the set of realizable complex values is ascertained that the SLM may reach in the complex plane. For a passive modulator, these values are of unit magnitude or less. These values will be called r(V), where V is the drive value (ordinarily voltage) that drives the modulator.

In step ST5, the metric T is formulated that tells how well the actual entire outgoing wave resembles the desired outgoing wave. Preferably, the metric T is a ratio whose numerator is the total energy in the wave, and whose denominator is the total error in the outgoing wave. For the sake of illustration, it will be assumed that it is insignificant whether the desired outgoing wave is multiplied by a complex constant before the error comparison is made with the actual outgoing wave. Then, such a matrix would be formulated as:

$$T = \frac{\Sigma |E_0 r|^2}{\Sigma |E_0 r - E_1 G e^{j\beta}|^2} \quad (10)$$

where the sum occurs over the controlled locations in the modulator, and G and β are the amplitude and phase, respectively, of the complex constant.

In step ST6, the set of realizable values for the SLM are chosen one location at a time. The values are chosen to extremize the metric (which is computed as a function of the whole set of locations on the modulator). For the metric of this embodiment the term "extremize" means maximization of the metric. However, other metrics may be extremized through minimization. The term "extremize" as used herein is therefore defined as being generic to both alternatives.

The metric is extremized by picking a global value for G and β, and then at each location on the modulator, determining the value of V (step ST7) such that r(V) as multiplied by the incoming wave's local value $E_0$, is closest by Euclidean measure to the desired outgoing value as multiplied by the global value $Ge^{j\beta}$. The values of G and β are searched over appropriate ranges. A maximal range for G is:

$$\frac{|z|_{max}}{|r|_{min}} \geq G \geq \frac{|z|_{min}}{|r|_{max}} \quad (11)$$

This process works for arbitrary set of realizable modulator values, and does not depend on any ideal behavior of the modulator.

Figure 10:
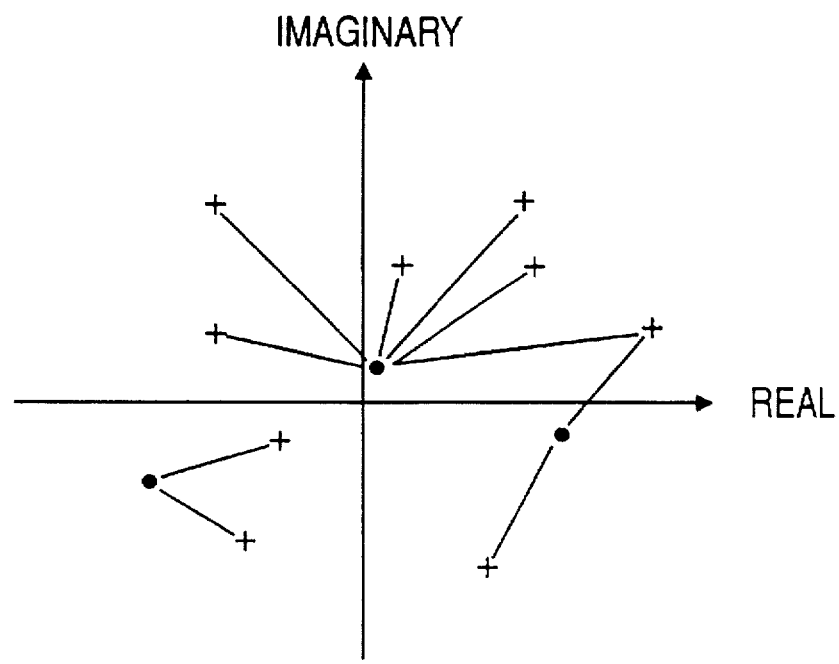
FIG. 10 is a graph illustrating one embodiment of choosing a set of realizable values for a ternary SLM.
Figure 11:
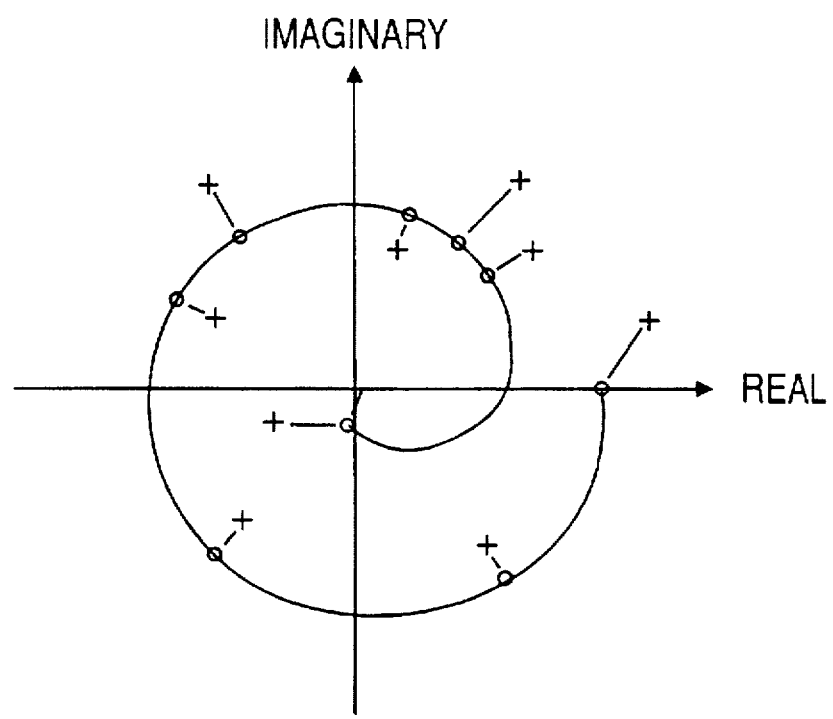
FIG. 11 is a graph illustrating one embodiment of choosing realizable values for an SLM having a curvilinear continuum in the complex plane.

FIGS. 10 and 11 illustrate determination of the optimum set of actual values of the transmittance. For a particular value of k, the ideal transmittance values of a number of pixels are marked as small plus signs. These are located in the same position in both FIGS. 10 and 11. However, FIG. 10 illustrates a ternary SLM while FIG. 11 illustrates an SLM having a domain of values constituting a curvilinear continuum. The optimum corresponding realized values are marked as small circles in FIG. 11 and as one of the solid dots representing the domain in FIG. 10. It will be appreciated that the error (here, the summed squared lengths of the line segments joining ideal and optimal realizable values) is less for the operating curve in FIG. 11 than for the ternary set of values in FIG. 10. In general there will be less error resulting from the use of this invention with a curvilinear or other wide-ranging set of complex values than from a further restricted set of values. Similarly this invention minimizes the error in comparison with other methods in the prior art, such as ignoring amplitude's variation with phase change.

An Optical Switch Apparatus and Method

Figure 1:
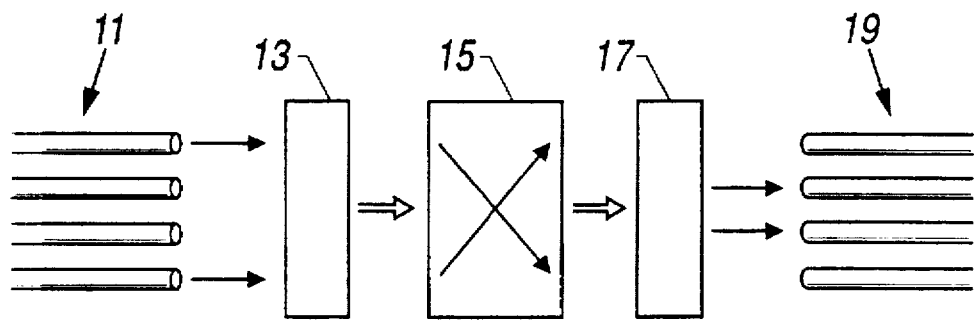
FIG. 1 illustrates a conventional electrical switching mechanism for optical communications.
Figure 2:
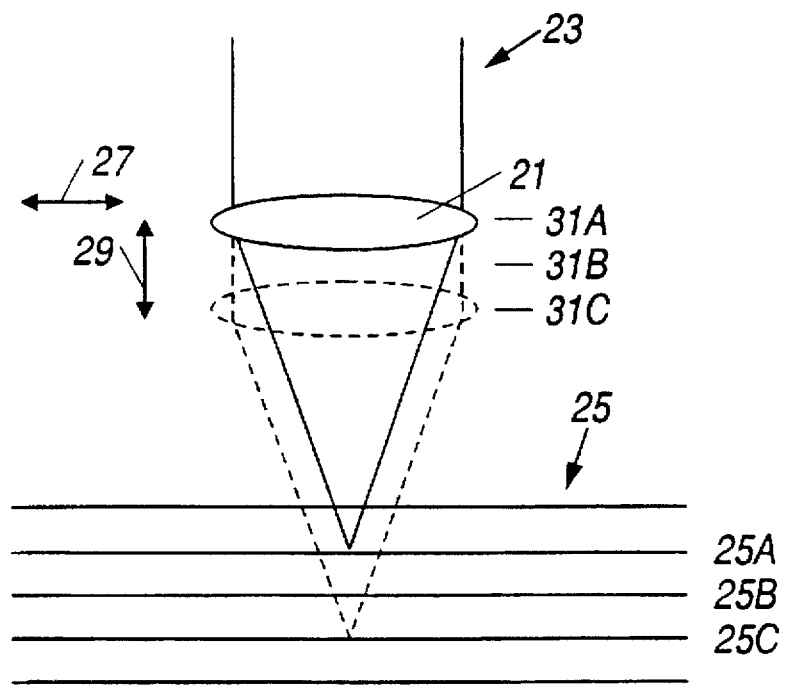
FIG. 2 illustrates a conventional apparatus for reading data from an optical storage medium.
Figure 3A:
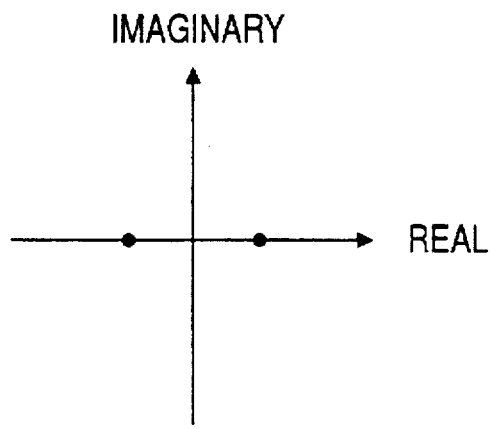
FIGS. 3a–3d illustrate the sets of complex values realizable using conventional SLMs.
Figure 3B:
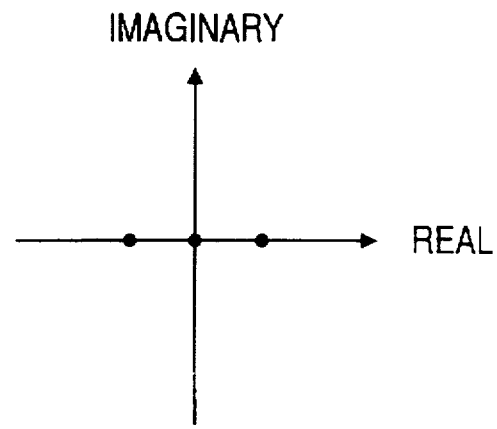
Figure 3C:
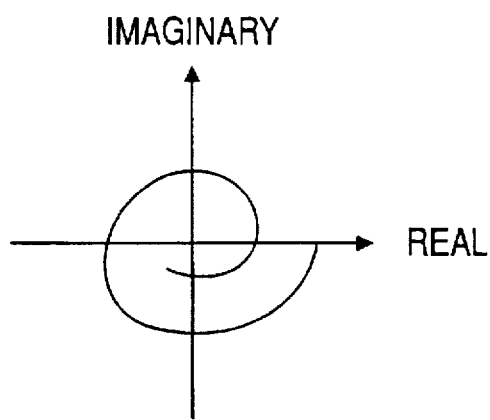
Figure 3D:
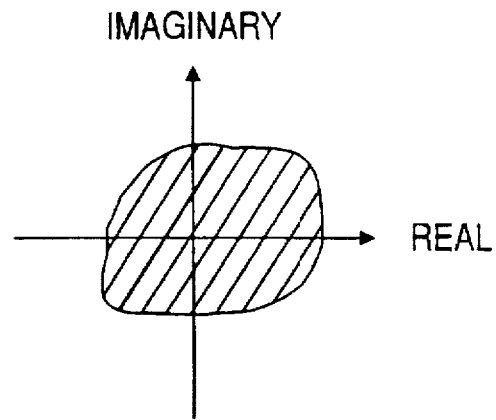
Figure 4:
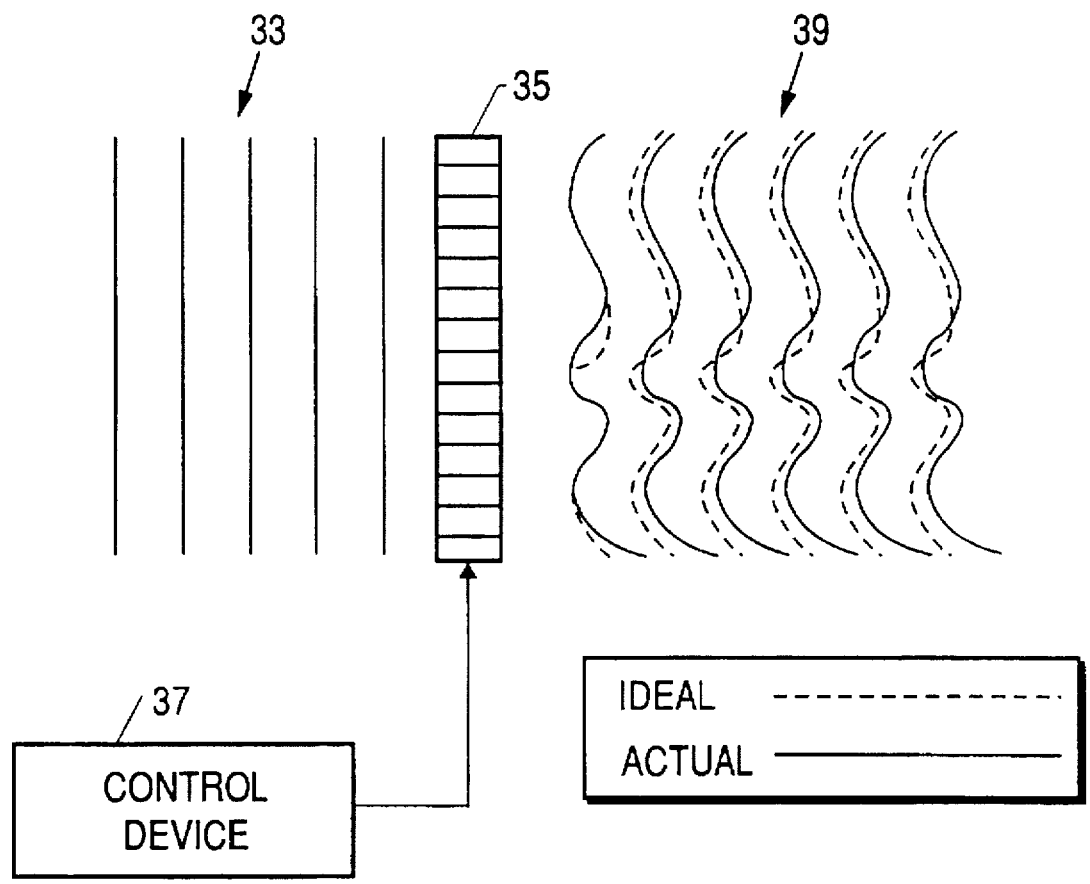
FIG. 4 illustrates the complex operation of an SLM.
Figure 12:
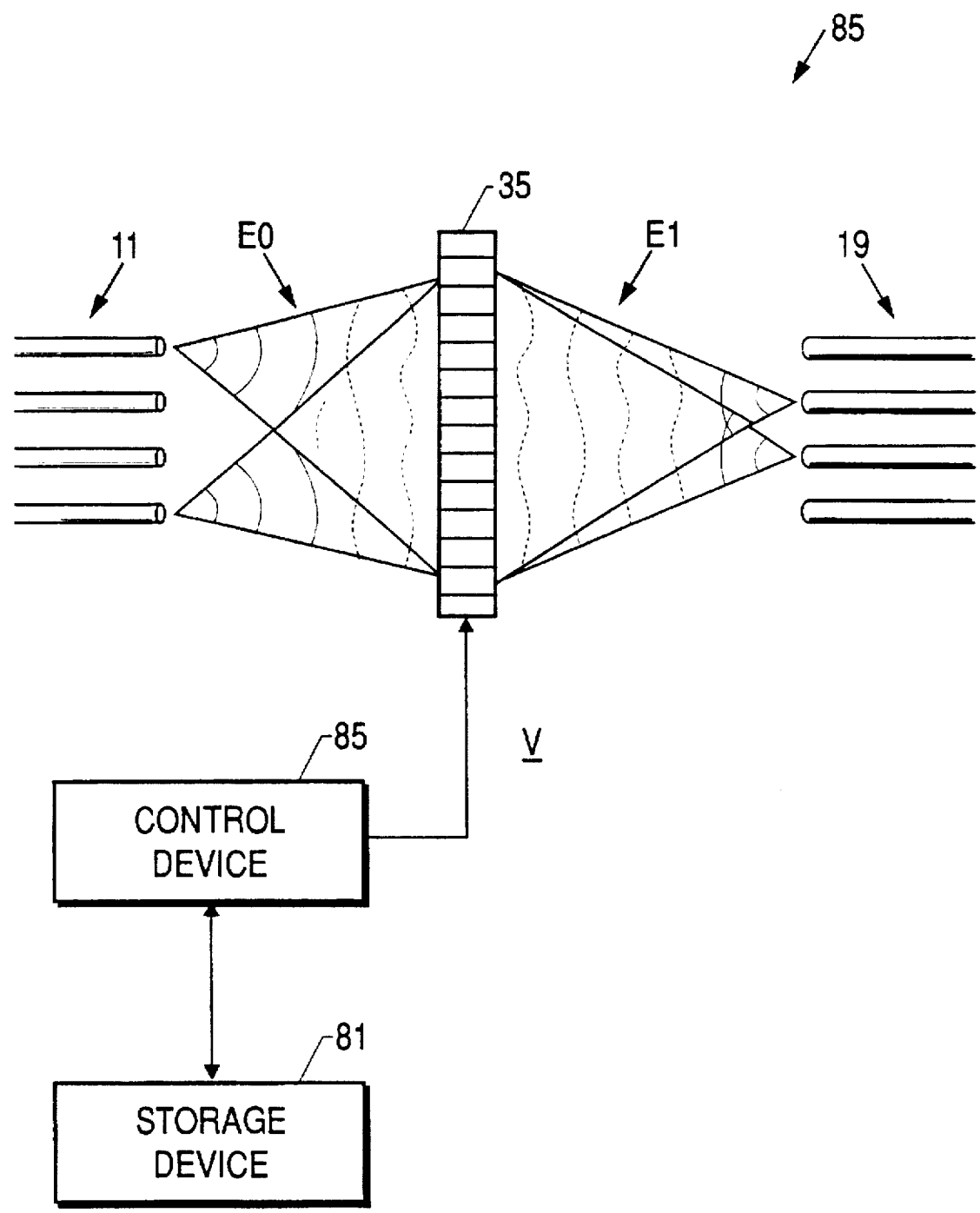
FIG. 12 illustrates an apparatus for switching light between a source array and a receiver array using an SLM in accordance with an embodiment of the invention.

An optical switch in accordance with an embodiment of the invention is shown in FIG. 12. Corresponding elements from FIG. 1 are denoted by the same reference numerals. In accordance with this embodiment, instead of converting the input light from source array 11 to electrical signals and re-encoding the switched electrical signals as in prior art FIG. 1, holographic switching is employed to direct the signals received from the sources within the array 11 to the proper receivers within array 19. Using the metric and optimization method described in detail above, and knowing the number of sources and receivers in arrays 11 and 19, the physical dimensions of the switch 83, and the characteristics of the SLM 35, drive signal V can be determined for every possible required switching function. Thus, a plurality of drive signals V(0-n) are determined in advance based upon the parameters and characteristics of the particular switch and stored in a storage device 81. When it is then desired that the switch perform a certain switching function, the appropriate drive signal Vx is retrieved from storage device 81 and applied to SLM 35 by a control device 85. This allows the switching to be achieved using the full advantages of the speed and bandwidth of light transmission, with a higher degree of accuracy and greater throughput than was possible in prior art, with very high switching speeds (because no recalculation is necessary), and with virtually limitless reconfigurability. In addition, the actual characteristics of the SLM are used and thus the method and apparatus do not depend on a possibly inaccurate model of its characteristics.

An Optical Storage Media Read/Write Apparatus and Method

Figure 13:
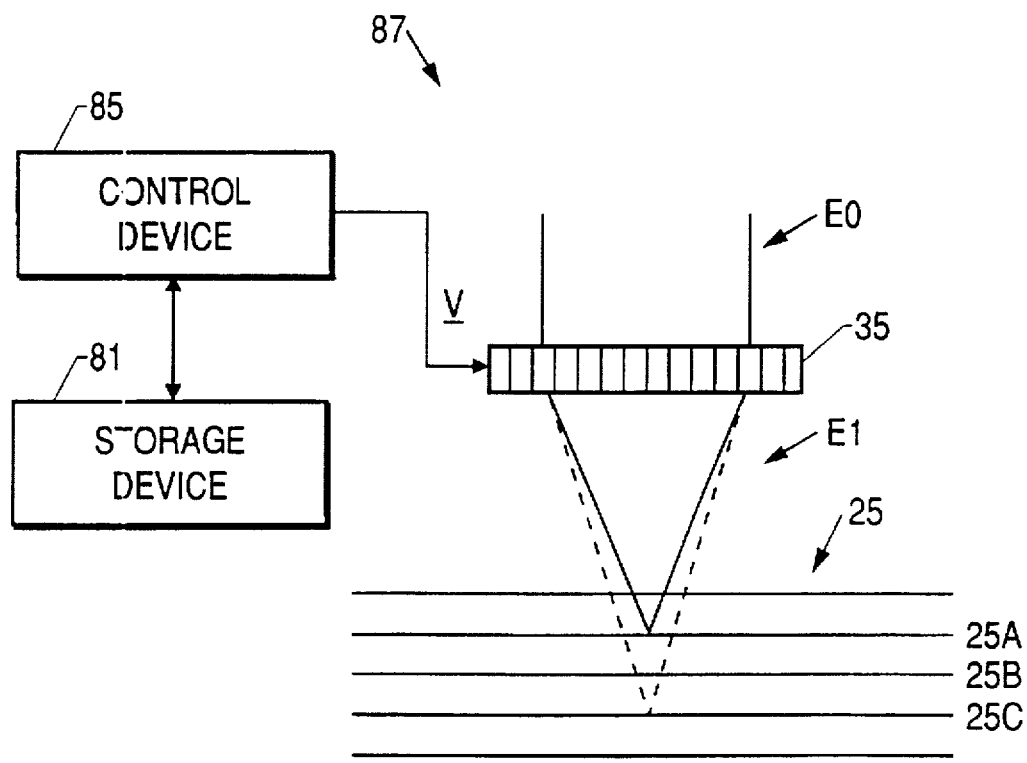
FIG. 13 illustrates an apparatus for reading and/or writing data from a multilayer optical recording medium using an SLM in accordance with an embodiment of the invention.

FIG. 13 illustrates another embodiment of the invention wherein a read and/or write apparatus for a multilayer optical recording medium 25 is constructed using an SLM 35. The manner in which information is read from and/or written to an optical storage medium is well known in the art and will not be repeated here. The invention, however, greatly facilitates reading and writing of information from an optical storage medium for the reasons that follow.

The read/write device is denoted generally as 87, and similar to the embodiment of FIG. 12 includes the SLM 35, a control device 85, and a storage device 81. In this case, the appropriate drive voltages V are determined based upon the input waveform $E_0$ and three desired output waveforms El that adjust the focal length to focus the output waveform on one of the three information recording layers 25A, 25B, and 25C. Once these drive values have been determined and stored in storage device 81, read device 87 is able to index between the three information storage layers (of course, there may be more or less layers than what is shown in this embodiment) without requiring any vertical movement of the read/write device. Accordingly, all of the advantages inherent in the use of the newly developed multilayer optical recording media can be achieved in accordance with the invention using industry standard drive means for driving the read/write device parallel to the recording media and without increasing mechanical complexity.

Figure 14:
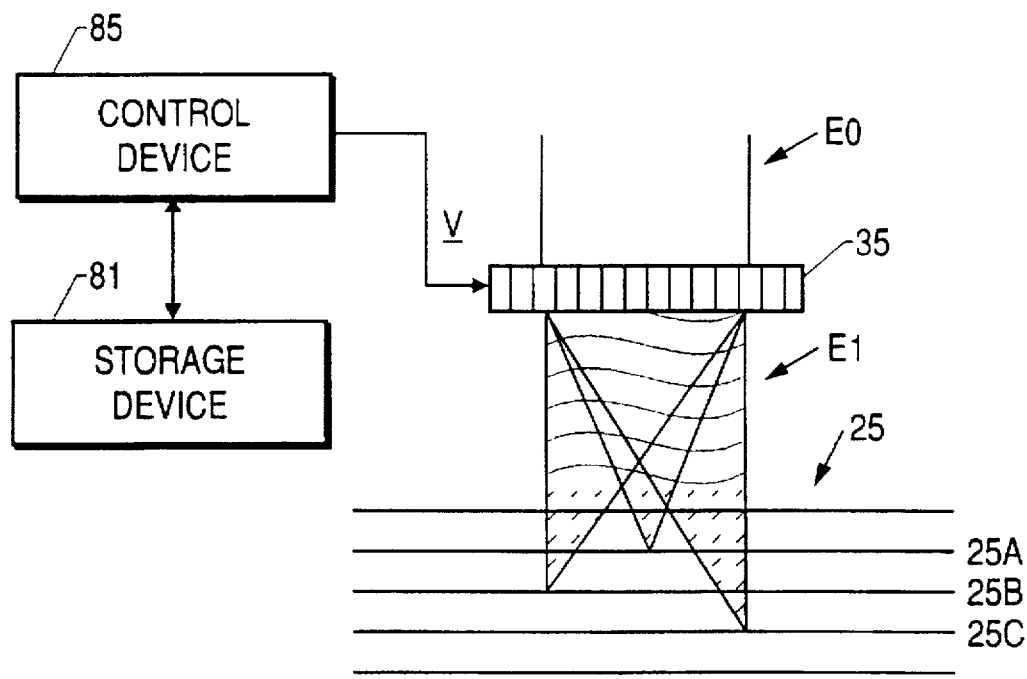
FIG. 14 is another view of the apparatus of FIG. 13.

It is important to note that the read/write device of the present invention has capabilities that were unattainable in the prior art. For example, as shown in FIG. 14, the drive signal V can easily be determined to cause the output wavefield $E_1$ to focus at three separate locations and on three different layers simultaneously. Thus, assuming sufficient bandwidth in the remainder of the system, multiple layers of the optical storage media can be read simultaneously.

It will be understood that, in the embodiment of FIGS. 12–14, the SLMs 35 are shown alone for simplicity. Other elements may be present such as polarizers and/or conventional optical elements to handle "coarse" optics.

Various embodiments of the invention have been shown and described above. However, the invention is not so limited, but rather is limited only by the scope of the appended claims.

What is claimed is:

1. An apparatus for communicating with an optical recording medium having a plurality of information storage layers, comprising:

a dynamic holographic optical element configured to focus light on the optical recording medium;

a control circuit arranged to supply a drive signal to said holographic optical element; and a storage device in communication with said control circuit and storing at least a first drive signal and a second drive signal;

wherein said holographic optical element focusses light on a first one of the plurality of information storage layers when driven by said first drive signal and said holographic optical element focusses light on a second one of the plurality of information storage layers when driven by said second drive signal.

2. The apparatus of claim 1, wherein said dynamic holographic optical element comprises a spatial light modulator.

3. The apparatus of claim 1, wherein said first drive signal produces a complex transmittance derived from a ratio of an input waveform received by said dynamic holographic optical element to an ideal output waveform having a focal point on the first one of the plurality of information storage layers.

4. The apparatus of claim 3, wherein said second drive signal produces a complex transmittance derived from a ratio of an input waveform received by said dynamic holographic optical element to an ideal output waveform having a focal point on the second one of the plurality of information storage layers.

5. The apparatus of claim 3, wherein said complex transmittance is optimized by extremizing a metric "T" having numerator reflective of total energy of the input waveform and a denominator reflective of error between an output waveform of the holographic optical element and said ideal output waveform.

6. The apparatus of claim 5, wherein the metric "T" is minimized.

7. The apparatus of claim 5, wherein the metric "T" is maximized.

8. The apparatus of claim 1, wherein information is stored on at least one of the information storage layers via said holographic optical element.

9. The apparatus of claim 1, wherein information is read from at least one of the information storage layers via said holographic optical element.

10. A method for communicating with an optical recording medium having a plurality of information storage layers using a dynamic holographic optical element configured to focus light on the optical recording medium, comprising:

storing at least a first drive signal and a second drive signal in a local storage device;

driving the dynamic holographic optical element with said first drive signal to cause said holographic optical element to focus light on a first one of the plurality of information storage layers; and driving the dynamic holographic optical element with said second drive signal to cause said holographic optical element to focus light on a second one of the plurality of information storage layers.

11. The method of claim 10, further comprising deriving said first drive signal from a ratio of an input waveform received by the dynamic holographic optical element to an ideal output waveform having a focal point on the first one of the plurality of information storage layers.

12. The method of claim 11, further comprising deriving said second drive signal from a ratio of an input waveform received by the dynamic holographic optical element to an ideal output waveform having a focal point on the second one of the plurality of information storage layers.

13. The method of claim 11, further comprising extremizing a metric "T" having numerator reflective of amplitude and a denominator reflective of error between an output waveform of the holographic optical element and said ideal output waveform to produce said first drive signal.

14. The method of claim 10, further comprising:

determining an actual arriving wave $E_0$ that arrives at the holographic optical element;

determining a desired departing wave, $E_1$, that leaves the holographic optical element;

computing a complex ratio of $E_1$ to $E_0$;

ascertaining a set of realizable complex values for the holographic optical element;

formulating a metric T equal to a ratio having a numerator reflective of total energy of $E_0$ and a denominator reflective of total error between $E_1$ and an actual waveform output by said holographic optical element;

choosing realizable complex values from said set of realizable complex values that extremize said metric T;

using said metric T to generate said first drive signal.

15. The method of claim 14, wherein said metric T comprises:

$$T = \frac{\Sigma |E_0 r|^2}{\Sigma |E_0 r - E_1 G e^{j\phi}|^2}$$

and the sum is taken over controllable locations on the holographic optical element.

16. The method of claim 10, wherein information is written to at least one of said information storage layers.

17. The method of claim 10, wherein information is read from at least one of said information storage layers.

* * * * *